Aug. 20, 1946.                J. H. DOERING ET AL                2,405,943
                                    TIRE
                            Filed March 29, 1943

J. H. Doering
R. H. McCarroll
INVENTORS

BY Edwin C. McRae
R. G. Farris
Attorneys.

Patented Aug. 20, 1946

2,405,943

UNITED STATES PATENT OFFICE 2,405,943

TIRE

Justus H. Doering, Detroit, and Russell H. McCarroll, Dearborn, Mich., assignors to Ford Motor Company, Dearborn, Mich., a corporation of Delaware Application March 29, 1943, Serial No. 480,926

3 Claims. (Cl. 154—14)

This invention relates to a tire construction and particularly to a method of securing a retread material that is not compatible with rubber or to a worn-tire carcass.

In the past retreading of worn carcasses has been used to increase the effective life of tires and to maintain per mile cost at a minimum. These procedures have made use of rubber materials that will bond to the worn carcass by vulcanization under heat and pressure. At present, however, it has become impossible to carry out the above procedure due to the shortage of the necessary types of rubber, the existing stocks of which may be utilized only for vital defense projects.

Many attempts have been made to employ synthetic rubbers or rubber substitutes—referred to generally as elastomers or rubber-like plastics—as possible replacements for rubber in this field. Many of these substitutes are unsatisfactory, not because of the lack of suitable physical properties so far as wear is concerned, but rather through failure in bonding under usual vulcanization practice. Further, they cannot be cemented securely since most suitable cements are not equally compatible with rubber and the rubber substitute used.

The object of this invention, therefore, is to provide a method by which rubber substitutes may be bonded to worn rubber carcasses. A particular advantage of this invention is that it releases natural rubber for more vital employment wherein rubber substitutes are not satisfactory. Another object of this invention is that it makes possible the bonding of two or more materials which ordinarily are not adherent to a common cementing agent.

With these and other objects in view, our invention consists in the arrangement, construction and combination of the various parts of our improved construction, as described in this specification, claimed in the claims and illustrated in the accompanying drawing in which:

Figure 1:
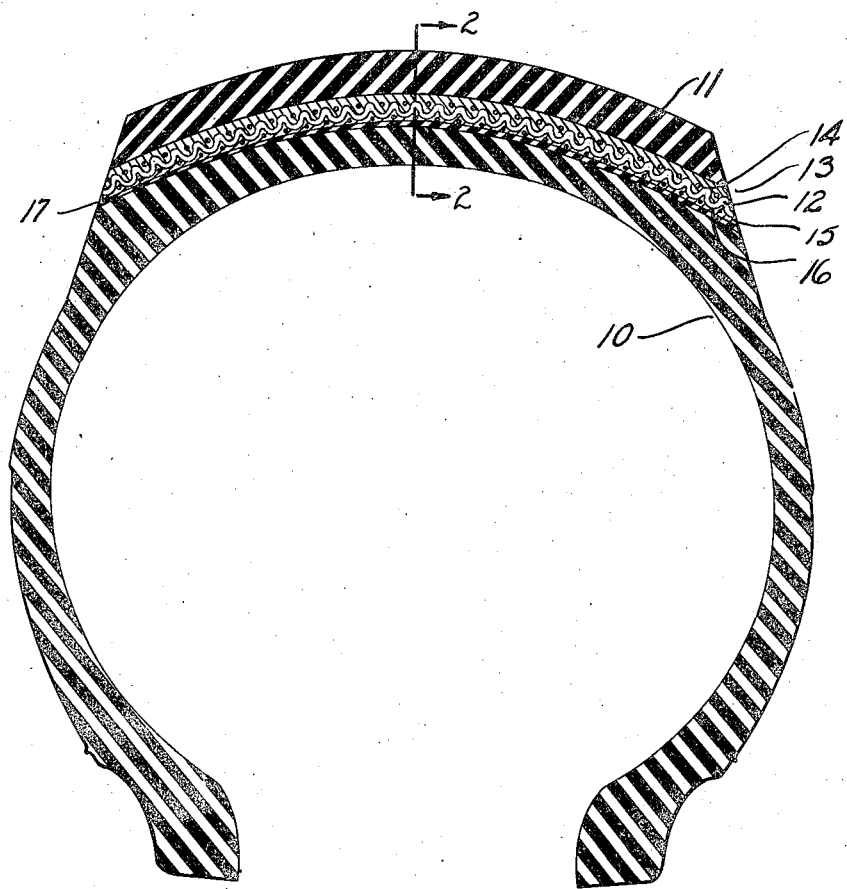
Figure 1 is a cross-sectional view of a tire showing our improved construction.
Figure 2:
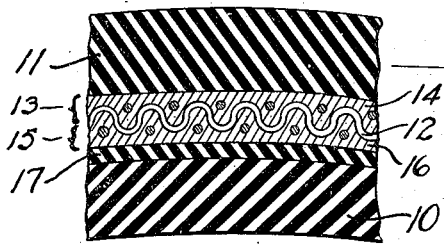
Figure 2 is a section on an enlarged scale, taken on line 2—2 of Figure 1.

With reference to the drawing, Figure 1 shows the cross-sectional view of a tire retreaded by this method in which the tire comprises the carcass 10 to which is joined the retread material 11. Between these materials is interposed a fabric sheet 12, shown in cross section, and the ti-gum layer 17. The fabric 12 comprises the usual warp and woof, but is shown diagrammatically in both views. The top portion 13 of the fabric is impregnated with one cement 14, while the bottom portion 15 is impregnated with a second cement 16, penetration of the impregnating cements being substantially equal and preferably coming in contact with each other at about the center of the fabric as indicated in Figure 2.

It has been found that certain synthetic rubbers and rubber-like plastics, hereinafter referred to as rubber substitutes, have been able to withstand physical tests almost comparable to those of natural rubber, but in most cases cannot be vulcanized directly to rubber. Employment of these substitutes requires, moreover, that they be bonded to materials with which they have been shown to be incompatible. Therefore, in many cases cement bonds between the substitutes and the base materials are only capable of withstanding slight stresses; this disadvantage nullifies and minimizes the excellent properties such as strength, basic resistance and chemical resistance otherwise attributable to these substitutes. By the present method butyl rubber, polymerized vinyl butylaldehyde, compositions containing vinyl chloride or its compounding with vinyl acetate, and other rubber-like substances with which satisfactory bonds formerly were not obtainable, can now be bonded.

This invention comprehends the laminating of rubber substitutes and rubber by placing between them a neutral element to which each may be bonded. The laminae in this retreading process are the tire carcass, interposed fabric, retread material and a plurality of cements chosen for individual compatibility and applied to the adjacent surfaces of the rubber substitute and tire carcass and impregnating the interposed fabric.

The bonding of the laminae for best results, as in conventional vulcanizing procedure, should be effected by heat and pressure. The retreading of tires is best accomplished in special retreading molds under conditions paralleling the molding of the original tire. Other means and provisions may, however, be employed to obtain like results.

In the built-up construction in Figure 1, a thin sheet of rubber, either natural or a synthetic, which may be Thiokol or neoprene, is used to enhance the bonding between the carcass and the fabric and may be adhesively secured as vulcanized to the carcass. This thin sheet, which is hereinafter referred to as ti-gum, is not an absolute necessity, but when used at thicknesses up to .050 of an inch, satisfactory bonds are obtained. As an example, ti-gums, made substantially from green milled rubber, when used in the lamina are coated with two or more coats of rubber cement on both the upper and bottom sides, the cement being the same as that which is normally employed on the carcass in the absence of interposed fabric.

The essential component of the construction shown in Figure 1 is the fabric 12 that is positioned between the ti-gum 17 and the retread materials 11. Many fabrics have been used, such as duck and the like, with the same successful results; that is, they provide a suitable base to which both the carcass and retread are cemented, and the bond obtained excels the direct cementing of carcass to retread. It is to be understood, however, that the resistance to stress of the composite lamina is largely governed by the strength of each individual component; and for this reason it is desirable to employ fabrics that are at least equal in strength to the other components used or to the bond obtainable. It has been found a double-woven belting is most suitable, since it has the necessary strength and body and may be woven to the exact width with elimination of all frayed edges.

The bottom cement 16, i. e., between carcass (or ti-gum) and fabric is preferably of a type commonly known as rubber cement, which is essentially a solution of rubber compound in benzol, gasoline or other suitable solvents. A formula of this cement may consist essentially of about 75 per cent of rubber, 19 per cent of carbon black and six per cent of accelerators, vulcanizers, stabilizers and the like that are dissolved or suspended in the benzol as a vehicle. This is, of course, adherent to the rubber and securely bonds the fabric by penetration through its interstices.

The top cement 14, i. e., between recap and fabric, is likewise formed by dissolving a portion of the base or substitute material in a suitable solvent such as in the making of cement for adhering butyl rubber to a fabric. It is possible to make a cement by dissolving the butyl rubber in benzol or other suitable solvent. Available cements, which are adherent to the recap and penetrant of the fabric fibers, have been made by dissolving a portion of the materials to be bonded in a suitable solvent. However, it is to be noted that other cements not having this direct relationship may be used and give excellent bonds as, for example, phenol condensates and many other like reactive or condensed materials displaying plasticity and strength and physically adherent to the recap. In the specific case of the use of polyvinyl compounds for recapping surfaces, it has been found that a solution of the polyvinyl compound in cyclohexanone provides an excellent adhesive between the recap material and the fabric.

The following procedure has been found satisfactory in applying a retread composed of a rubber substitute on to a worn carcass: The carcass surface is properly prepared and both sides of the ti-gum are coated with two or more even coatings of rubber cement, each coating of cement being allowed to become tacky before the second coat is applied and before the components are assembled. Likewise, one surface of the retread material is coated with suitable cement, the usual cement being composed of the retreading materials dissolved in a solvent. Application of the cement to the fabric in position between the ti-gum and the retread material must be accomplished with greater care. It is necessary that the fabric be impregnated from both sides with two widely differing cements which are in themselves noncompatible. It is desirable, of course, that each cement penetrates the fabric substantially to its center. Correct penetration is necessary to deposit sufficient solids of both cements in the fabric interstices as well as within the fiber structure to insure an excellent bond. It is, therefore, necessary that cements having a fairly high solid content and a low viscosity be used in order that the thicker solids may be carried into the inner structure of the fibers by positive capillary action. Upon vulcanization or subjection to heat and pressure in a mold the laminated retreaded tire becomes a unitary structure, the cement solids thoroughly permeating the cellular structure of the fabric as well as the fibers thereof to form an integral mass.

Some changes may be made in the arrangement, construction and combination of the various parts of this improved construction without departing from the spirit of this invention, and it is the intention to cover by the claims such changes as may be reasonably included within the scope thereof.

The invention claimed is:

1. The method of applying polyvinyl compound recaps to worn carcasses which comprises the steps of preparing the carcass, applying to said prepared carcass a plurality of coatings of a rubber cement containing as solids about 75 per cent rubber and 19 per cent carbon black suspended in a solvent, similarly coating one surface of a cushioning strip compatible with such rubber cement and not exceeding .050 of an inch thick, causing the two prepared surfaces to adhere to each other, applying rubber cement to the exterior of the cushioning strip, pressing a layer of fabric into contact with the cement coated surface to cause the fabric to adhere to the cushioning strip and become impregnated to the center with the rubber cement, coating a strip of the polyvinyl compound recap material with a cement comprising a solution of the recap material in cyclohexanone, pressing the coated surface firmly in contact with the fabric to cause the recap material to adhere to the fabric and the cement to impregnate the fabric substantially to the center, and vulcanizing the entire assembly.

2. The method of applying polyvinyl compound recaps to worn carcasses which comprises the steps of preparing the carcass, applying to said prepared carcass a plurality of coatings of a rubber cement, similarly coating one surface of a cushioning strip compatible with such rubber cement and not exceeding .050 of an inch thick, causing the two prepared surfaces to adhere to each other, applying rubber cement to the exterior of the cushioning strip, pressing a layer of fabric into contact with the cement coated surface to cause the fabric to adhere to the cushioning strip and become impregnated to the center with the rubber cement, coating a strip of the polyvinyl compound recap material with a cement comprising a solution of the recap material in suitable solvent, pressing the coated surface firmly in contact with the fabric to cause the recap material to adhere to the fabric and the cement to impregnate the fabric substantially to the center, and vulcanizing the entire assembly.

3. The method of applying polyvinyl compounds as recaps to worn carcasses which comprises the steps of assembling on a tire carcass in the order named, a cushioning member, a cementitious substance compatible with the cushioning member, a closely woven fabric member, a second cementitious substance, and a polyvinyl recap, said second cementitious substance comprising polyvinyl compounds dissolved in cyclohexanone, said fabric member being impregnated from one side to the center with the first mentioned cementitious substance, and being impregnated from the other side with the second mentioned cementitious substance, heating said assembly in a mold to cure said cementitious substances and bond said polyvinyl recap and said carcass to the fabric member by heat and pressure.

JUSTUS H. DOERING.
RUSSELL H. McCARROLL.